United States Patent [19]

Ruback et al.

[11] 4,008,557
[45] Feb. 22, 1977

[54] TOPPING MECHANISM FOR SUGAR CANE HARVESTERS

[75] Inventors: Keith Ruback; Rolf Haines, both of Bundaberg, Australia

[73] Assignee: Massey-Ferguson Services N.V., Curacao, Netherlands Antilles

[22] Filed: Oct. 10, 1975

[21] Appl. No.: 621,273

[52] U.S. Cl. .................................................. 56/63
[51] Int. Cl.$^2$ ...................................... A01D 45/02
[58] Field of Search ............................... 56/56–59, 56/63, 13.9, 14.3, 11.2

[56] References Cited

UNITED STATES PATENTS

| | | | |
|---|---|---|---|
| 3,325,982 | 6/1967 | Fogels et al. | 56/11.2 |
| 3,398,515 | 8/1968 | Ash | 56/63 |
| 3,596,447 | 8/1971 | Makeham et al. | 56/63 |

Primary Examiner—Russell R. Kinsey
Attorney, Agent, or Firm—Robert L. Farris

[57] ABSTRACT

Topping mechanism capable of selective delivery of cane tops to either side, for use in a two-way sugar cane harvester. The mechanism has a pair of contra-rotating in-running cutters which are always rotated in the same direction and which assist the discharge of cut tops for both directions of top delivery. The cutters have mounted on them hub members carrying projecting feed members which serve both to gather the cane tops and to discharge them. A top deflector is pivotally mounted between the cutters and according to its position deflects the tops selectively towards either of the cutters according to the desired direction of delivery.

10 Claims, 3 Drawing Figures

TOPPING MECHANISM FOR SUGAR CANE HARVESTERS

This invention relates to topping mechanisms for sugar cane harvesters.

In Australian Pat. No. 405,003 there is disclosed a topping mechanism or topper for a sugar cane harvester. The topper removes the tops from the cane crop at a position in front of the remainder of the harvester. Control means is provided whereby the tops can be directed by the harvester operator either to one side or to the other side of the topper whereby the topper is capable of two-way operation without discharging tops into the unharvested crop.

The topper disclosed in Australian Pat. No. 405,003 employs a single rotating cutter disc having projecting blades to sever the cane tops. A generally V-shaped guide wall is mounted above the cutter disc with its apex pointing forwards and a forwardly projecting deflector is pivotally mounted adjacent the apex of the wall. The direction of discharge of tops by the topper is changed from one side to the other by reversing the direction of rotation of the cutter disc and by moving the deflector through an angle of 60°.

While the topper of Australian Pat. No. 405,003 gives effective and positive discharge of tops, the provision of a robust and reliable mechanism for reversing the drive to the cutter disc at the end of each row of cane is somewhat expensive, no matter what form of drive is employed.

In an attempt to avoid the need to reverse the drive to the cutter, it has been proposed to provide a topper which is otherwise similar to that of Australian Pat. No. 405,003 but which is provided with a pair of contra-rotating discharge elements mounted one on each side of the deflector. The discharge elements have projecting fingers which are intended to act to carry the tops over the cutter and along the wall for discharge. The discharge elements are intended to have a greater influence than the single unidirectional rotating cutter disc on the direction of discharge of cane tops. However the influence of the cutter disc inevitably means that top discharge in one direction is much less efficient than in the other direction.

In Australian Pat. No. 435,699 there is disclosed a topper which has the advantage that the requirement to reverse the drive to the cutter for two-way operation, is eliminated by the use of a pair of contra-rotating cutters in combination with a pivoted deflector. In this way the unidirectional influence of a single rotating cutter is completely eliminated.

However the topper disclosed in Australian Pat. No. 435,699 employs gathering chains carrying fingers to gather the tops. These chains and fingers and their drives require maintenance and can become wrapped with cane tops.

It is an object of the invention to provide a topper having the above-mentioned advantage of the topper of Australian Pat. No. 435,699 but with improved top gathering apparatus.

According to the invention there is provided a topping mechanism for a sugar cane harvester as defined in claim 1 of the accompanying claims.

An embodiment of the invention will now be described by way of example with reference to the accompanying drawings in which.

Figure 1:
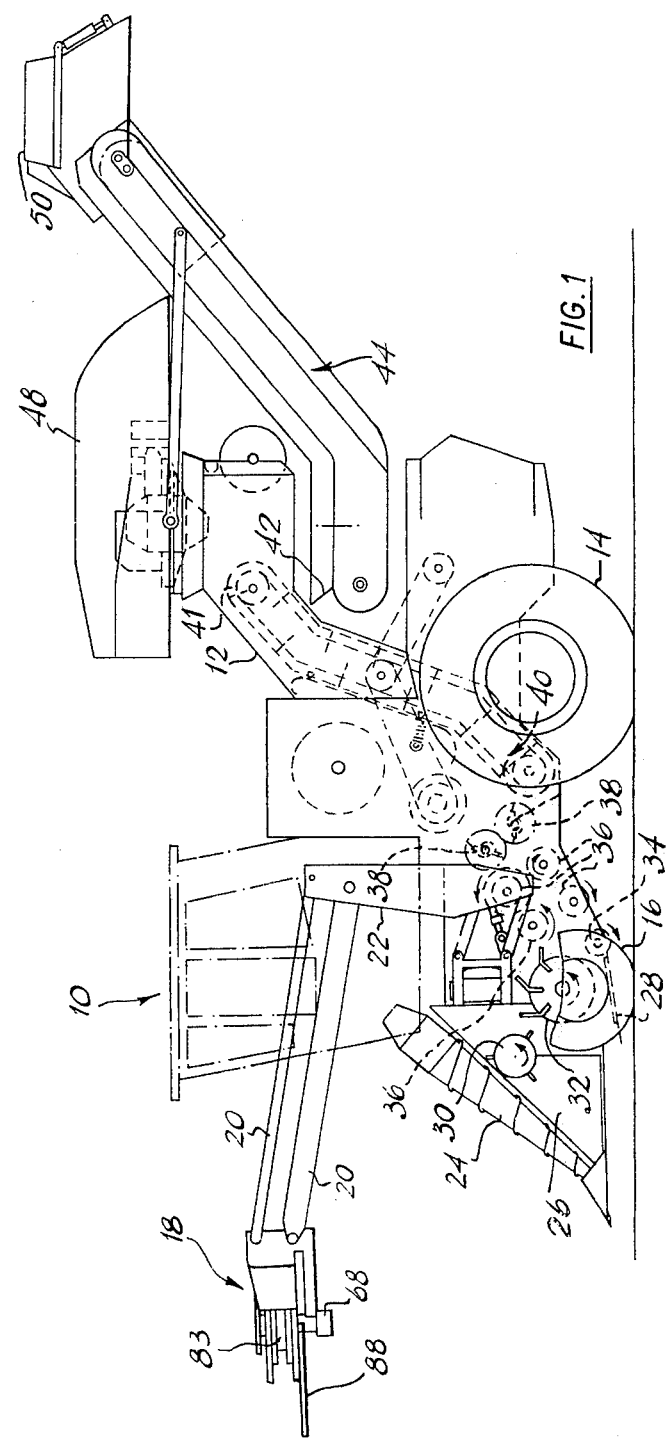
FIG. 1 shows in side elevation a sugar cane harvester including a topping mechanism, the harvester's internal crop handling apparatus being also indicated.

As shown in FIG. 1, a sugar cane harvester 10 comprises a body portion 12 mounted on rear traction wheels 14 and forward steerable wheels 16.

A topping mechanism 18 to sever the tops from standing canes is mounted by means of a parallelogram linkage 20 on an upstanding post 22 towards the front end of body portion 12. A hydraulic ram (not seen in FIG. 1) is provided to raise and lower linkage 20 and the topping mechanism 18.

Body portion 12 has a pair of rotatable crop lifting augers 24 each surmounting one of a pair of crop gathering walls 26 defining a throat into which the standing or lifted cane passes. The canes are severed from their roots by a pair of contra-rotating base cutters 28 and fed rearwards by paddle rollers 30, 32, butt lifter roller 34, and four feeding and cleaning rollers 36 to a pair of contra-rotating cane chopping elements 38.

Cane billets from choppers 38 fall onto a primary chain and slat elevator conveyor 40 and fall from the upper end 41 thereof into a hopper 42 feeding a secondary chain and slat elevator 44 from which they are dropped into a trailer (not shown). Two sets of extractor fan operated trash removal apparatus 48 and 50 remove trash from the cane billets as they pass through the harvester.

The structure and operation of topping mechanism 18 will now be described.

Figure 2:
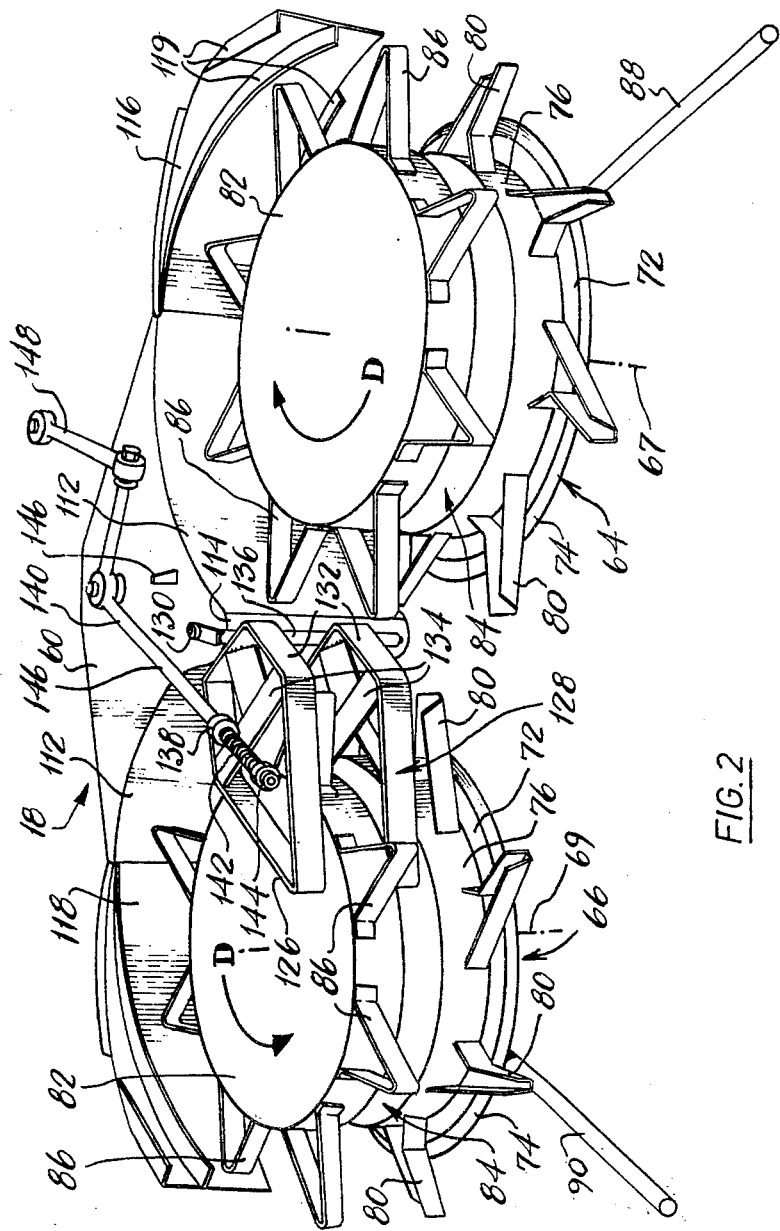
FIG. 2 is a perspective view from in front and slightly above of the topping mechanism of FIG. 1.
Figure 3:
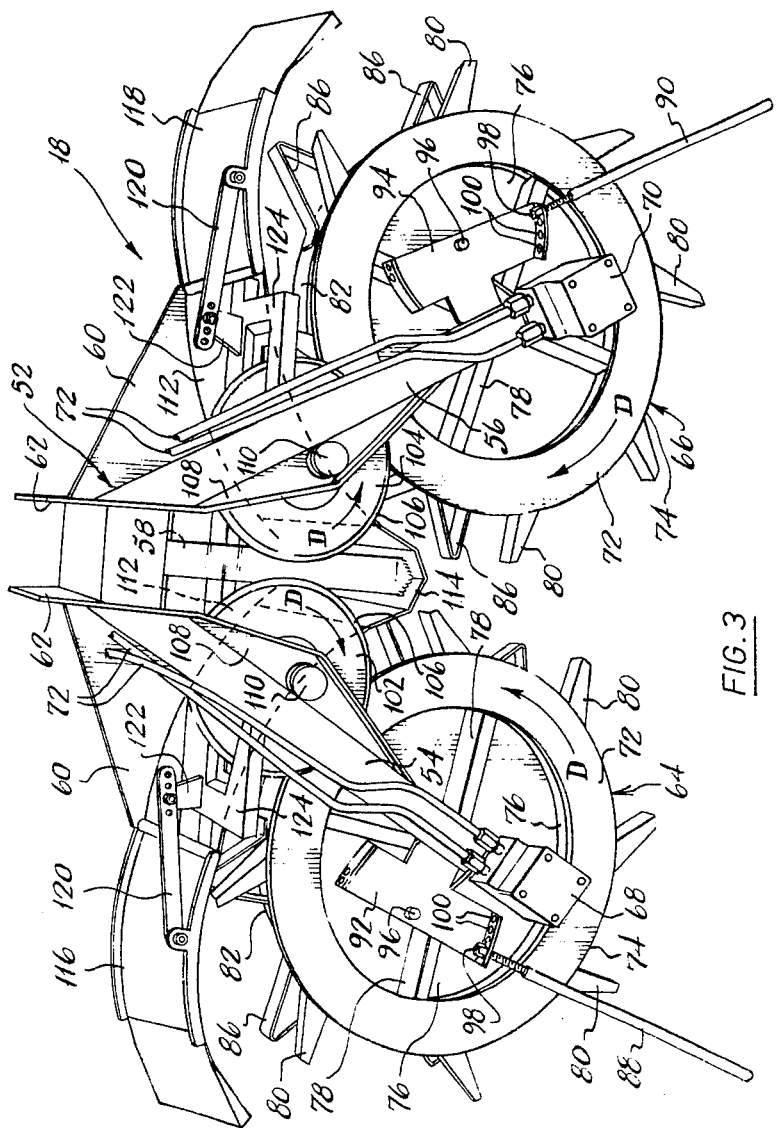
FIG. 3 is a perspective view from the rear and below of the topping mechanism of FIG. 1.

As shown in FIGS. 2 and 3, topping mechanism 18 comprises a rigid supporting framework 52 having diverging beams 54, 56 a central strut 58 and a top plate 60. A pair of parallel plates 62 provide attachment means for the connection of parallelogram linkage 20 to the framework.

A pair of spaced rotatable cutters 64, 66 are mounted one on each of the beams 54, 56 respectively. The cutters are rotated about respective vertical axes 67, 69 in the directions indicated by the arrows D by a drive constituted by respective hydraulic motors 68, 70 supplied with hydraulic fluid by conduits 72.

Each cutter 64, 66 has an annular cutting member 72 formed with a bevelled cutting edge 74. Each cutting member 72 is detachably secured by means of a series of fasteners (not shown) to a cylindrical central hub member 76 having internal radial stiffeners 78.

A first series of feed members 80 are fixed to the cylindrical outer surface of hub 76 and each projects beyond cutting edge 74 defining the cutting circle of the cutter. Each of these feed members is channel-shaped in cross section and tapers towards its outer end. The outer end of each feed member 80 is swept forwards with respect to the direction D of rotation of the cutter, i.e., it is located on the leading side of a radius through the inner end of the feed member.

A second hub member 82 is mounted above each hub member 76 and spaced therefrom by a cylindrical spacer 83 (see FIG. 1) so as to define an annular slot 84. Hub member 82 is of substantially the same dimensions as hub member 76.

A second or upper series of feed members 86 is fixed to the cylindrical outer surface of hub 82, and each feed member projects beyond the cutting circle of its respective cutter defined by bevelled edge 74. Each feed member 86 is formed of a length of steel strip formed into a V-shaped and welded to hub 82. Each of these feed members is arranged substantially symmetrically with respect to a radius through its outer end.

Hub members 76, 82 together with their associated feed members 80, 86 constitute crop gathering means.

A pair of crop gathering rods 88, 90 are mounted on beams 54, 56 respectively to define the gathering width of the topper. The rods are mounted on beams 54, 56 through mounting plates 92, 94 fixed thereto. The rods are connected to these plates through respective pivot pins 96, 98. A spring-biased detent 98 on each rod extends through a selected one of a series of holes 100 formed in the plates 92, 94 whereby the angular position of the rods can be adjusted.

As shown in FIGS. 2 and 3, the cutting edges 74 of cutters 64, 66 do not overlap and complementary disc-shaped resilient steel cutters 102, 104 respectively are provided, one for each cutter, to co-operate therewith. Each of the cutters 102, 104 has a bevelled circular cutting edge 106 and is mounted on a web 108 fast with its respective beam 54, 56. The webs carry bearings 110 whereby the cutters 102, 104 are freely rotatable.

Each cutter 102, 104 bears against the underside of its respective annular cutting member 72 so as to be rotated thereby and define an in-running nip therebetween for thorough cutting of all cane tops and trash. It will be noted that the cutting edges of cutters 102, 104 are formed by bevelling their lower surfaces whereas annular cutting members 72 are bevelled on their upper surfaces.

A V-shaped top-deflecting wall 112 is mounted on framework 52 behind cutters 64, 66 with its apex 114 projecting forwards between the cutters. At each side of the topping mechanism, the wall and the two hub members 76, 82 co-operate to define a passage for the discharge of cane tops. The position of the wall is such that the gap between the outer end of each feed member 80, 86 and the wall is not substantially greater than 6.35 millimeters as the feed member moves past the wall.

A pair of adjustable wall portions 116, 118 are pivotally mounted one at the outer end of each limb of the V-shaped wall 112 so as to modify the direction of discharge of cane tops therefrom. Each of the wall portions 116, 118 has three vanes 119 welded to its concave inner surface, the vanes extending outwardly and downwardly so as to deflect the cane tops towards the ground. The position of each wall portion can be adjusted by means of a stay 120 having a series of apertures to receive a pin whereby the stay is secured to a bracket 122 carried by a support 124 fixed to the respective beam 54 or 56.

As shown in FIG. 2, upper and lower deflector members 126, 128 are mounted on framework 52 for angular movement about a vertical axis defined by a pivot pin 130 adjacent the apex 114 of wall 112. Each deflector member is generally V-shaped at its forward end and is formed into a rigid closed framework by a three sided-structure 132 integral with the forward end and by an internal T-shaped stiffener 134.

The deflector members are each welded at their rear ends to a vertical post 136 so as to move in unison. The upper deflector member 126 has a collar 138 pivotally mounted thereon which is slidingly received on a control rod 140. A coiled compression spring 142 is trapped between the collar and a washer 144 retained by a nut at the end of the rod. Movement of the deflector members from one side of apex 114 towards a central position causes compression of the spring which thus exerts an over-center action on the assembly. The two limiting positions of the deflector members are defined by stops 146 on top plate 60 engageable with rod 40 so as to hold the lower deflector member 128 within annular slot 84 but just clear of spacer 83.

Control rod 140 is connected to a linkage 148 (only shown in part) whereby the deflector members can be moved across from one limit position to the other by the operator of the cane harvester from his cab.

In use, the tops of a row of standing cane are guided by gathering rods 88, 90 towards the contra-rotating combined gathering and top cutting units. The projecting feed members 80, 86 engage the uncut tops and feed them into the gap between said units. The tops engage one side edge of each deflector member 126, 128 and (with the deflector member in the position shown in FIG. 2) are deflected away from cutter 66 and towards cutter 64 before they reach the region of the apex 114 of V-shaped wall 112. The tops are thereby positively guided into the passage between the wall 112 and hub members 76 and 82. The lower feed members 80, on account of their forward inclination, force the cane sticks into the in-running nip between cutters 64 and 102 and against the cutting edge of disc 102. The cut is effected by a scissor action between the two discs.

The severed tops are discharged laterally by the feed members 76, 82, the precise direction of discharge being influenced by the adjustable wall portion 116, the vanes 119 of which direct the tops downwards, thereby lessening the effect of cross winds on the trajectory of the tops.

At the end of the row of cane, the harvester turns round and returns in the opposite direction along the next row and cane tops are discharged to the right hand side of the machine. This is achieved merely by moving deflector members 126, 128 over-center to their other limit position whereupon tops are severed and directed in the opposite direction in an exactly analogous manner.

The principal advantages of the embodiment described above are:

1. efficient discharge of tops in either direction without reversing the cutter drive;
2. simple gathering mechanism provided in combination with the cutters, thereby eliminating costly separate drives;
3. less trash wrapping in the gathering mechanism;
4. less servicing of the gathering mechanism.

Among modifications which can be made in the above embodiment without departing from the scope of the invention is the provision of a sharpened cutting edge on only the large or small cutting discs (preferably the small) or the use of projecting sharpened blades instead of a continuous cutting edge. In the latter case a fixed anvil to co-operate with said blades could be provided in place of the small disc cutters. The term "cutter" is to be construed accordingly, and as including within its scope an unsharpened shearing member. The term "cutting circle" as used herein means the circle described by the outermost cutting portion of a rotary cutter.

What we claim is:

1. A topping mechanism for a sugar cane harvester including a main frame, attachment means on the main frame for attaching the topping mechanism to a sugar cane harvester, a right hand arm extending generally forward from the main frame, a left hand arm extending generally forward from the main frame, a right hand cutter mounted on the right hand arm for rotation about a generally vertical axis, a left hand cutter mounted on the left hand arm for rotation about a generally vertical axis, drive means for both cutters which drive the cutters in opposite directions so that adjacent portions of the two cutters move in a direction to pass sugar cane therebetween, a deflector member pivotally mounted on the main frame between the right hand arm and the left hand arm for deflecting sugar cane toward the right hand cutter, or for deflecting sugar cane toward the left hand cutter, and sugar cane gathering means for directing sugar cane toward the deflector member and the cutters.

2. The topping mechanism for a sugar cane harvester of claim 1 wherein the sugar cane gathering means include a drum coaxially mounted with each cutter and having a plurality of feed members for engaging sugar cane extending outwardly from the drum.

3. The topping mechanism for a sugar cane harvester of claim 1 wherein a right hand complimentary cutting member is mounted on the right hand arm adjacent to the right hand cutter and cooperates therewith in the severance of sugar cane tops and a left hand complimentary cutting member is mounted on the left hand arm adjacent to the left hand cutter and cooperates therewith in the severance of sugar cane tops.

4. The topping mechanism for sugar cane harvesters of claim 3 wherein each complimentary cutting member is a rotatably mounted disc with a circular outer cutting edge.

5. The topping mechanism for sugar cane harvesters of claim 3 wherein the right hand cutter and the left hand cutter both include a disc with a circular outer cutting edge.

6. The topping mechanism for sugar cane harvesters of claim 1 including a generally V-shaped wall mounted on the main frame with its apex projecting forward between the cutters.

7. The topping mechanism for sugar cane harvesters of claim 6 wherein the generally V-shaped wall includes a right hand wall section which cooperates with the right hand cutter to direct cut sugar cane tops to the right hand side of the topper and a left hand wall section which cooperates with the left hand cutter to direct cut sugar cane tops to the left hand side of the topper.

8. The topping mechanism for sugar cane harvesters of claim 7 wherein the generally V-shaped walls have vanes attached to their outer ends for deflecting cut cane tops downwardly.

9. The topping mechanism for sugar cane harvesters of claim 7 wherein the generally V-shaped walls both include a pivotally attached outer end and adjustment means for holding each of the pivotally attached outer ends in a selected position to deflect cut sugar cane tops in the desired direction.

10. The topping mechanism for sugar cane harvesters of claim 1 wherein the deflector member includes positioning means to position the deflector member so that it will deflect sugar cane to the selected cutter.

* * * * *